United States Patent [19]

Sylling et al.

[11] Patent Number: 4,687,505

[45] Date of Patent: Aug. 18, 1987

[54] METHOD FOR DESALINATION AND REHABILITATION OF IRRIGATED SOIL

[76] Inventors: Truman V. Sylling, 371 E. Ross Rd., El Centro, Calif. 92243; Stephen L. Allen, 3327 Fairlomas Rd., National City, Calif. 92050

[21] Appl. No.: 732,501

[22] Filed: May 9, 1985

Related U.S. Application Data

[63] Continuation-in-part of Ser. No. 547,866, Nov. 2, 1983, abandoned.

[51] Int. Cl.[4] .......................... C05G 3/04; C09K 17/00
[52] U.S. Cl. .......................................... 71/27; 71/903; 405/264; 106/900

[58] Field of Search ...................... 71/903, 904, 27, 1; 106/900; 405/263, 264

[56] References Cited

U.S. PATENT DOCUMENTS 3,900,378  8/1975  Yen et al. ........................ 71/903 X
4,303,438 12/1981  Zaslavsky et al. ............... 71/903 X Primary Examiner—Ferris H. Lander

[57] ABSTRACT

Method for the desalination and reclamation of irrigated soils through application to the soil of minute amounts of one or more anionic compounds having threshold properties in dilute aqueous solution.

4 Claims, No Drawings

METHOD FOR DESALINATION AND REHABILITATION OF IRRIGATED SOIL

CROSS-REFERENCE TO RELATED APPLICATION

This is a continuation-in-part of copending application Ser. No. 547,866 filed Nov. 2, 1983, now abandoned.

BACKGROUND OF THE INVENTION

This invention relates generally to soil conditioning and particularly pertains to a method for desalination and reclamation of irrigated soil.

Soils irrigated with water of a high total dissolved solids (salt) content (500 ppm or greater) typically accumulate salts and/or alkalis that inhibit crop growth. Salts, mainly chlorides, carbonates, and sulfates or sodium, potassium, calcium, and magnesium are typically measured as the electrical conductivity (mmhos./cm.$^2$) of a saturation extract of the soil. An electrical conductivity greater than 4.0 mmhos./cm.$^2$ indicates that a soil is saline. In saline soils the effect of salts on plants is mainly indirect; that is, the effect of the salts on osmotic water potential, and the resultant reduced uptake of water by germinating seeds and roots of established plants. An alkaline soil (sodic) is a soil that has accumulated large amounts of sodium and is determined by calculating the sodium adsorption ratio (SAR) of the saturation extract of the soil. An SAR greater than 15 indicates that a soil is alkaline. In alkaline soils crop growth is inhibited by sodium toxicity. Typically, alkaline soils are also saline compounding toxic sodium levels with reduced plant water uptake ability. Therefore, alkaline-saline soils are particularly deleterious to seed germination and plant growth. It becomes advantageous to remove sodium from the alkaline soils and calcium from calcareous saline soils.

Soil salinity/alkalinity is highly influenced by physical characteristics of the soil such as, the hydraulic conductivity and infiltration rates. Climate, as it affects the evapotranspiration rates from the soil and plants, also plays an important role in the extent of salt and/or alkali accumulation in the soil. Finally, agricultural irrigation practices have an important part in determining whether sales and/or alkalis will accumulate in soils. Known techniques and practices for removing salts and/or alkalis are often expensive and relatively ineffective. One such technique is amending the soil by incorporation of cattle manure and/or green manures into the top soil to maintain a porous condition that will induce infiltration of water into the soil. In high temperature climates, typical of irrigated arid regions, these organic amendments decay rapidly and their influence on soil properties is lost. Another technique involves the application of gypsum, sulfuric acid, or elemental sulfer to facilitate the removal of sodium. This technique requires large quantities of materials (typically on the order of tons/acre), considerable manpower and fuel, and is only temporarily effective. Yet another technique previously employed is the mechanical practice of chiseling, deep plowing, and slip plowing to improve water movement into and through the soil profile. This practice is of a relatviely short-term benefit because the soils tend to slake down and close up after being irrigated requiring reworking on a yearly basis.

It is therefore desirable to have a method for desalination and reclamation of irrigation soil which is relatively inexpensive, easy to perform, and effective to remove the salts and/or alkalis in order to enhance crop yield.

SUMMARY OF THE INVENTION

It is the primary object of the present invention to provide an improved method for desalination and reclamation of irrigated saline and/or alkaline solids.

In accordance with the present invention, soil in which salts and/or alkaline components have built up from irrigation water is treated with very small amounts of certain anionic low molecular weight synthetic polymeric compounds and/or organophosphorous compounds in aqueous solution to inactivate or remove the salts and/or alkaline components and to improve the crop yielding ability of the soil.

DETAILED DESCRIPTION

I have found that certain anionic materials or their substantially neutral water soluble salts applied to a soil in minute amounts are effective to reduce the harmful effects of salts and/or alkalis which had accumulated in the soil from irrigation water. Thus soil in which such salts and/or alkalis have reached the concentration that whitish deposits appeared on its surface and on which crop growth was unacceptably low is restored to useful fertility level through the action of these materials.

The material(s) is/are applied suitably by incorporation in irrigation water to insure uniform distribution in the soil in depth. An alternative application involves spraying, injecting, or "flying on" the material(s) directly to the ground.

The amount of active material(s) required per unit are a will depend on the extent to which salts and/or alkalis have accumulated, but the amount is not in stoichiometric relation to the salt and/or alkali concentration in the soil. No exact figures can be given since the nature of the soil also affects the amount of active material(s) required, but, for moderate salt and/or alkali accumulation, useful effects have been obtained by application of from 0.1 pound to 15.0 pounds per acre over a 4 to 48-hour period, while for heavy accumulation, from 1.0 to 25.0 pounds per acre over a 12 to 96-hour period may be needed. The materials(s) is/are preferably applied in a plurality of spaced treatments to insure improvement of the soil in depth, and the treatments may continue in extreme cases until the soil is fully saturated.

Anionic materials having threshold activity suitable for use in the present soil treatment process include low molecular weight, water miscible synthetic polymers containing free carboxyl groups, organophosphorous acids, and substantially neutral salts of these. Threshold activity refers to sub-stoichiometric chemical processes of which dispersancy and calcium carbonate stabilization are important factors. As described in *Journal of the Cooling Tower Institute*, Vol. 3, No. 1, Winter 1982, page 17 et seq., in the article of Leonard Duebin entitled "The Effect of Orpganaphosphorus Compounds And Polymers on CaCO3 Crystal Morphology," calcium carbonate stabilization is understood to involve an increase in average particle size and a change in the gross shape of calcium carbonate crystals, and dispersancy involves surface charge effects.

Anionic polymeric materials for use in the present process include polymers, copolymers and sulfonated polymers and copolymers of acrylic acid, methacrylic acid, hydrolyzed polymers and copolymers of maleic anhydride and substantially neutral water soluble salts of these. The commercially available material known as "Belclene 200", a product of Ciba-Geigy Corporation, of Ardsley, New York, which is understood to be a water soluble hydrolyzed maleic anhydride polymer having low molecular weight, e.g. from 300 to 5000, or salt of such polymer, has been found particularly useful (see U.S. Pat. No. 3,963,636).

Organophosphorus agents for use in soil treating include phosphonic acids as hydroxyethylidene diphosphonic acid, amino tri (methylenephosphonic acid), and nitrilo trismethylene triphosphonic acid, phosphinic acids such as phosphinocarboxylic acid, and substantially neutral salts of these acids.

These anionic polymers, organophosphorus acids, and/or substantially neutral water soluble salts of these may be used alone or in combination of two or more.

High molecular weight polymethacrylates are used as ion exchange fertilizers are described in U.S. Pat. No. 4,396,412. The form of the polymethacrylate is a solid to which various fertilizer constituents are bound. These ion exchange fertilizers are useful in soils that are subjected to waters with a low salt content such as in hydroponic agriculture. It is an intent of this invention to use low molecular weight liquid polymethacrylates on soils subjected to irrigation with high salt waters and is not intended as a means of introducing fertilizers to crops.

To those versed in the art it is understood that applying to soils various species of organophosphorus compounds is common for the addition of micro-nutrients such as iron, manganese, and other essential metals as described in U.S. Pat. No. 3,958,972. This invention relates to the use of these compounds to lower harmful salts and/or alkalis and to improve a crops ability to absorb water.

U.S. Pat No. 4,098,814 describes a method for manufacturing several species of organophosphorus compounds and suggests their use in the manufacture of liquid fertilizers to prevent mineral deposits from forming in the manufacturing equipment. It is not the intent of this invention to prescribe a method for manufacturing these compounds or the use thereof in the manufacture of liquid fertilizers.

One of ordinary skill in the art of water treatment knows of these compounds and their mechanisms of performance in controlling mineral deposits in dilute aqueous solution in cooling towers and boilers. This invention relates to a new process that employ these compounds to achieve unexpected results. These compounds increase the solubility of sodium, potassium, calcium, and magnesium salts by dispersing these salts found in the soil pore spaces. These salts when dispersed have a large increase in surface area that is available to be wetted, effectively shifting the equilibrium from the solid phase to the dissolved liquid phase. The precipitated salts are dispersed because the Helmholtz double layer model for dispersancy is satisfied by the presence of the high negative charge density of these compounds. Additionally, the precipitation of dissolved sodium, potassium, calcium, and magnesium salts present in the irrigation water is inhibited as the soil drys. This is a result of crystal distortion effects at the surfaces of forming crystals. The net effect of both mechanisms (dispersancy and crystal distortion) in calcareous saline soils is the removal of precipitated calcium salts from the soil pore spaces. The net effect of both mechanisms (dispersancy and crystal distortion) in sodic alkaline soils is to provide excess calcium and magnesium cations to displace sodium from the colloidal clay surface resulting in substoichiometrically induced cation exchange, facilitating the removal of sodium from the soil. The action of these compounds forces the mineral salts deep into the soil or discharges them through the field tile drains, resulting in an improved drainage and percolation rate, reduction of soil salts and/or alkalis, improvement in the crops ability to absorb water, and increase germination and yield.

It is to be understood that this proposed mechanism is advanced only as a possible assistance in understanding the invention and that patentability is based on the novelty and utility of the process and not the correctness of the mechanism proposed.

The following examples are given to aid in understanding the invention, but it is not limited to the particular procedures, conditions or materials of the examples. In each case there was noted an increase in the percent of seeds germinated as well as an increase in the rate of germination, that is the seeds began to grow more rapidly and in greater numbers. Also, there was noted an improvement in the percolation of the soil as evidenced by a marked increase in salinity and flow of water through drain tile. Furthermore, there was a very evident removal of encrusted salt on the soil surface. Each example is representative of other experimental treatments performed on Imperial Valley agricultural land in Imperial County, Calif.

EXAMPLE I

A 35-acre sugar beet field in Imperial Valley was noticed to have 50% to 60% germination prior to treatment. It was watered twice using the method of the instant invention with $2\frac{1}{4}$ pounds of Belclene 200 per acre, each watering being about 24 hours in duration and spaced about five weeks apart. The first watering was a sprinkler irrigation to germinate the seed, and the second was flood irrigation. The typical results described above were noted following the treatment with as much as 90% to 95% germination. The adjacent field, which was watered at the same rate and manner but without treatment, was usd for comparison purposes, and where it used to provide a yield more than double the production of the field that was treated, the productivity of both fields are now about equal.

EXAMPLE II 200 acres of a brand new field of alfalfa in Imperial Valley was watered twice, the first being a sprinkler irrigation before seeding at about 3 pounds per acre, and the second being flood irrigation about six weeks later at about $1\frac{3}{4}$ pounds of Belclene 200 per acre with the same typical results described above in comparison to an adjacent field which was watered at the same time.

EXAMPLE III 42 acres of asparagus were watered six times at about ten-day intervals using about 1 pound of Belclene 200 per acre during each watering. The soil texture was visually improved, it having a better agglomeration as opposed to the much larger particle size in the adjacent field. Plants were greener after the treatment and much more vigorous in appearance in comparison to those on the adjacent field which even appeared brown in color.

EXAMPLE IV

A 10-acre spinach field was flood irrigated just after seeding with 2 pounds of Belclene 200 per acre. Germination was noticeably accelerated compared to an adjacent untreated field that was watered at the same time, and the germination period was only 50% to 60% of the normal time previously experience before treatment.

EXAMPLE V 30 acres of bermuda grass was flood irrigated twice for 12 hours with about three weeks between waterings. 1 pound of Belclene 200 per acre was used in each watering, and now the bermuda grass is growing in soil that previously did not grow any bermuda grass.

EXAMPLE VI

A saline 40 acre field was divided into 20 acre sections. Prelimiary soil analysis show a soil salinity of 7.0 mmhos./cm$^2$. The field was planted in wheat and sprinkle irrigated to germinate the seed and then flood irrigated until harvest. Both sections of the field was farmed identically. One 20 acre section was used as an untreated control. The other 20 acre section was treated with Belclene 200 at the following dosages.

| Sprinkle irrigated (germination) Flood irrigated | 3.0 lbs./ac. |
|---|---|
| #1 | 2.0 lbs./ac. |
| #2 | 1.0 lbs./ac. |
| #3 | 1.0 lbs./ac. |
| #4 | 1.0 lbs./ac. |
| #5 | 1.0 lbs./ac. |
| #6 | 1.0 lbs./ac. |

In total 10.0 lbs./ac. of Belclene 200 were applied through the growing cycle. The field was then harvested. The untreated portion showed a yield of 2.81 ton/ac. wih not change in soil salinity. The treated portion showed a yield of 3.23 ton/ac. with a reduction in soil salinity to 3.9 mmhos./cm.$^2$.

EXAMPLE VII

An alkaline (sodic) soil was treated at a rate of 3.0 lbs./ac./irrigation of Belclene 200 via 4 flood irrigations. A portion of the soil was watered without treatment to establish a control. A SAR of the soil prior to the experiment was 27. After four applications the control soil showed an SAR of 15 while the treated soil showed an SAR of 6.

While the invention has been described with reference to specific materials and procedures, it is to be understood that various different modifications are possible and are contemplated within the true spirit and scope of the appended claims. There is no intention, therefore, of limitation to the exact abstract or disclosure herein presented.

What is claimed is:

1. A process for reducing harmful effects of alkaline deposits in irrigated soils comprising applying to the soil an aqueous solution of an anionic polymaleic anhydride compound having threshold properties, said anionic compound or neutral salt thereof being applied in a quantity of from about 0.1 pound to about 25 pounds per acre of land applied directly to the soil prior to irrigation or by incorporation into irrigation water applied to the soil over a period of from about 4 to about 96 hours.

2. A process as recited in claim 1 in which said aqueous solution adds to the irrigation water and/or provides a soil water concentration from about 0.1 to about 100 ppm of hydrolyzed polymaleic anhydride having a molecular weight of from about 300 to about 5000 or its substantially neutral water soluble salt.

3. Use of an anionic polymaleic anhydride compound having threshold properties or the neutral water soluble salts thereof to treat irrigated soil, said anionic compound or neutral salt thereof being applied in a quantity of from about 0.1 to 25 pounds per acre over a period of from about 4 to 96 hours and being applied directly to the soil prior to watering or with water.

4. The use as set forther in claim 3 wherein the polymaleic anhydride has a molecular weight of from 300 to about 5000.

* * * * *

UNITED STATES PATENT OFFICE
CERTIFICATE OF CORRECTION

PATENT NO. : 4,687,505

DATED : August 18, 1987

INVENTOR(S) : Truman V. Sylling and Stephen L. Allen

It is certified that error appears in the above-identified patent and that said Letters Patent are hereby corrected as shown below:

Column 1, Line 55: "soil properties" should read --soil physical properties --
Column 4, Line 43: "usd" should read --used--
Column 4, Line 47: "Example II" should be centered in column
Column 5, Line 35: "wih" should read --with--
Column 5, Line 35: "not" should read --no--
Column 6, Line 39: "forther" should read --forth--

Signed and Sealed this

First Day of December, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,687,505
DATED : August 18, 1987
INVENTOR(S) : Truman V. Sylling

It is certified that error appears in the above-identified patent and that said Letters Patent are hereby corrected as shown below:

Column 1, Line 18: "or" should read "of".

Column 1, Line 68: "irrigation" should read "irrigated".

Column 3, Line 19: "are" should read "as".

Column 5, Line 4: "experience" should read "experienced".

Column 5, Line 18: "was" should read "were".
Column 5, Line 24: "Sprinkle irrigated" should read "Sprinkle irrigated 3.0 lbs./ac.
Column 5, Line 25: "Flood irrigated    3.0 lbs/ac." should read "Flood irrigated"

Signed and Sealed this

Nineteenth Day of April, 1988

*Attest:*

DONALD J. QUIGG

*Attesting Officer*        *Commissioner of Patents and Trademarks*